US007361311B2

(12) United States Patent
Cooks et al.

(10) Patent No.: US 7,361,311 B2

(45) Date of Patent: Apr. 22, 2008

(54) SYSTEM AND METHOD FOR THE PREPARATION OF ARRAYS OF BIOLOGICAL OR OTHER MOLECULES

(75) Inventors: Robert G. Cooks, West Lafayette, IN (US); Zheng Ouyang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 588 days.

(21) Appl. No.: 10/335,007

(22) Filed: Dec. 31, 2002

(65) Prior Publication Data

US 2003/0226963 A1 Dec. 11, 2003

Related U.S. Application Data

(60) Provisional application No. 60/387,241, filed on Jun. 7, 2002.

(51) Int. Cl.

| | |
|---|---|
| ***B01L 3/02*** | (2006.01) |
| ***B01L 11/00*** | (2006.01) |
| ***B01D 59/44*** | (2006.01) |
| ***H01J 49/00*** | (2006.01) |
| ***G01N 1/00*** | (2006.01) |
| ***G01N 1/18*** | (2006.01) |
| ***G01N 1/22*** | (2006.01) |

(52) U.S. Cl. ...................... 422/100; 422/101; 250/283; 250/284; 250/287; 250/299; 436/174; 436/177; 436/181

(58) Field of Classification Search .................. 422/58, 422/100, 101; 250/283, 284, 287, 299; 436/174, 436/177, 181

See application file for complete search history.

(56) References Cited

U.S. PATENT DOCUMENTS

| | | | | |
|---|---|---|---|---|
| 5,905,258 | A | 5/1999 | Clemmer et al. | |
| 6,204,500 | B1 | 3/2001 | Whitehouse | |
| 6,600,155 | B1 * | 7/2003 | Andrien et al. | 250/287 |
| 6,750,448 | B2 * | 6/2004 | Turecek et al. | 250/281 |

FOREIGN PATENT DOCUMENTS

| | | |
|---|---|---|
| EP | P77723EP00 | 8/2007 |

OTHER PUBLICATIONS

Bingbing Feng, Retrieval of DNA Using Soft-Landing after Mass Analysis by ESI-FTICR for Enzymatic Manipulation, J.Am.Chem. Soc. 1999 121, 8961-8962.*

(Continued)

*Primary Examiner*—Jill Warden
*Assistant Examiner*—Keri A Moss
(74) *Attorney, Agent, or Firm*—Lawson & Weitzen, LLP; Sonia K. Guterman; Adam M. Schoen

(57) ABSTRACT

A method of separating species in a mixture of molecules, particles or atoms and collecting the separated species is described. The method comprises the steps of converting by ionization the species in the mixture to gas phase ions, separating the gas phase ions according to their mass charge ratio and/or mobility and collecting the separated ions. The system includes ionizing means such as electrospray to form the gas phase ions. The gas phase ions are separated by filtering, or in time or in space and soft-landed for collection such as on a surface.

22 Claims, 13 Drawing Sheets

OTHER PUBLICATIONS

Bromann, K., et al., "Controlled Deposition of Size-Selected Silver Nanoclusters", *Science*, vol. 274, Nov. 8, 1996, pp. 956-958.

Cooks, R. G. et al., "The 'Thomson', A Suggested Unit for Mass Spectroscopists", *Rapid Commun. Mass Spectrom.*, 1991, 5(2), p. 93.

Feng, B., et al., "Retrieval of DNA Using Soft-Landing after Mass Analysis by ESI-FTICR for Enzymatic Manipulation", *J. Am. Chem. Soc.*, 1999, vol. 122, No. 38, pp. 8961-8962.

Franchetti, V., et al., "Soft Landing of Ions as a Means of Surface Modification", *Int. J. Mass Spectrom., Ion Phys.*, 23 (1977), pp. 29-35.

Geiger, R. J., et al., "Modifications to an analytical mass spectrometer for the soft-landing experiment", *Int. J. of Mass Spectrom.*, 182/183 (1999), pp. 415-422.

Liu, H., et al., "Development of Multichannel Devices with an Array of Electrospray Tips for High-Throughput Mass Spectrometry", *Anal. Chem.*., 2000, 72, pp. 3303-3310.

Luo, H., et al., "Mass Spectrometry and Ion Processes", *Int. J. of Mass Spectrom., Ion Processes*, 74 (1998), pp. 193-217.

Miller, S. A., et al., "Soft-Landing of Polyatomic Ions at Fluorinated Self-Assembled Monolayer Surfaces", *Science*, vol. 275, Mar. 7, 1977, pp. 1447-1450.

Schwartz J. C., et al., "A Two-Dimensional Quadrupole Ion Trap Mass Spectrometer", *J. Am. Soc. Mass Spectrom.*., 13 (2002), pp. 659-669.

Siuzdak, G., et al., "Mass spectrometry and viral analysis", *Chemistry and Biology*, vol. 3, No. 1, 1996, pp. 45-48.

Wells, J. M., et al., "A Quadrupole Ion Trap with Cylindrical Geometry Operated in the Mass-Selective Instability Mode", *Anal. Chem.*, 70 (1998), pp. 438-444.

Bingbing Feng, David S. Wunschel, Christophe D. Masselon, Ljiljana Pasa-Tolic, Richard D. Smith, "Retrieval of DNA Using Soft-Landing after Mass Analysis by ESI-FTICR for Enzymatic Manipulation", J. Am. Chem. Soc. 1999, 121, pp. 8961-8962.

Miliotis et al., 2001, J.ournal of Chromatography B, 752: 323-334.

* cited by examiner

Simultaneous operations:
Accumulation + Selective Ejection/Ion Landing

SYSTEM AND METHOD FOR THE PREPARATION OF ARRAYS OF BIOLOGICAL OR OTHER MOLECULES

CROSS REFERENCE TO RELATED APPLICATIONS

This application claims benefit under 35 U.S.C. § 119(e) to U.S. Provisional Application Ser. No. 60/387,241, filed Jun. 7, 2002.

BRIEF DESCRIPTION OF THE INVENTION

This invention relates generally to a system and method for the preparation of arrays of separated biological or other molecules from a mixture of proteins or other molecules.

BACKGROUND OF THE INVENTION

Micro arrays having a matrix of positionally defined reagent target spots for performing chemical tests are known. Known reagents are deposited by spotting techniques well known in the art. In analyzing a sample, it is reacted with the array and separate chemical tests are performed with the reagent at each spot.

Mass spectrometers of various types have been used to identify molecules including proteins by mass analysis. The molecules are ionized and then introduced into the mass spectrometer for mass analysis. In recent years, mass spectrometers have been used by biochemists to identify both small and large molecules including proteins and to determine the molecular structure of the molecules including proteins.

Mixtures of biological compounds are normally separated by chromatographic techniques before the components of the mixture are mass analyzed. In some instances, chromatographically separated components of the mixture are used to create chips or arrays.

In proteomics the aim is to quantify the expression levels for the complete protein complement, the proteome, in a cell at any given time. The proteome is individual, environment and time dependent, and has an enormous dynamic range of concentration. Separation by two dimensional electrophoresis or electrophoresis and creation of spots on an array is cumbersome and slow. Modern analytical methods such as mass spectrometry are used for final analysis of the separated components of the protein complement.

Soft-landing of ions onto surfaces was proposed in 1977 [4] and successfully demonstrated two decades later [5]. Intact polyatomic ions were mass-selected in a mass spectrometer and deposited onto a surface at low kinetic energies (typically 5-10 eV). SIMS analysis was used to confirm the presence of a soft-landed species, $C_3H_{10}Si_2O^{35}Cl^+$, on a fluorinated SAM surface. Evidence suggests that ions with sterically bulky groups have better deposition efficiencies than small ions [6]. Organic cations [7] and a 16-mer double-stranded DNA [8] (mass ca. 10 kDa) have also been soft-landed intact onto surfaces as have metal clusters [9]. In some of these cases there is evidence that the molecular entity on the surface is the ion, in others that it is the corresponding neutral molecule. There is even evidence [11] that intact viruses can be ionized, passed through a mass spectrometer under vacuum and collected and remain viable.

There is a need for a different separation method coupled with the storage of molecules, including proteins, in an array.

SUMMARY AND OBJECTS OF THE INVENTION

In the present system and method, the sample molecules in a mixture of proteins or other biochemical molecules are ionized, separated in the gas phase as ions of different masses, and deposited or soft landed on a substrate where they are stored for later processing or analysis. More particularly, the molecules of the biological compounds, including proteins and oligonucleotides are ionized by, for example, electrospray ionization, matrix assisted laser desorption ionization or other ionizing means. The ionized molecules of the mixture are separated according to mass, charge and mobility or a combination of these parameters as ions or the corresponding neutrals, and then soft-landed at separate positions on a substrate to form an array. The collected biomolecules at each position can then be identified and analyzed by affinity bonding or other biochemically specific processes and by laser based techniques such as surface enhanced raman spectroscopy (SERS), fluorescence, or Matrix Assisted Laser Desorption/Ionization (MALDI), or other mass spectrometric methods of analysis.

It is an object of the present invention to provide an improved system and method for separating and storing ions of proteins or other biochemical molecules, as an array of separated proteins or other biomolecules in a format where they can be identified or reacted further or otherwise processed.

It is a further object of the present invention to provide a system and method in which molecules of a biochemical compound are ionized, separated according to mass, mobility or both, and stored as a microarray of spots of particular separated proteins or other biomolecules for subsequent analysis. The spots of particular biological reactivity can then be identified or analyzed or used as reagents.

It is also an object of the present invention to make an array of molecules from known or unknown compounds to serve as the substrate for assays.

BRIEF DESCRIPTION OF THE DRAWINGS

The invention will be more clearly understood from the following description when read in conjunction with the accompanying drawings in which.

DESCRIPTION OF PREFERRED EMBODIMENT

Figure 1:
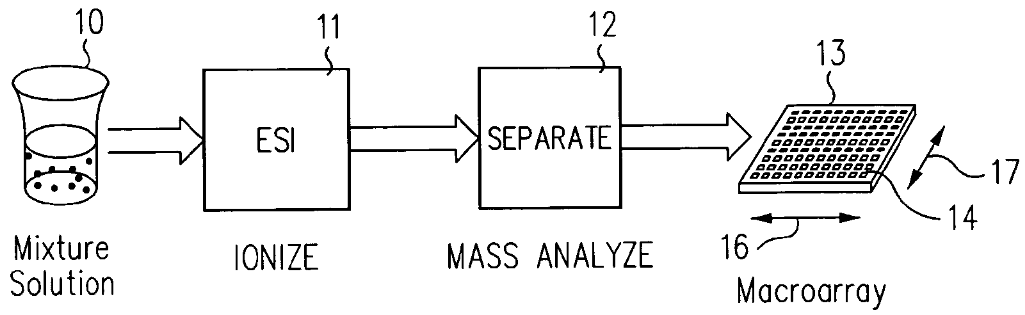
FIG. 1 is a flow chart showing the steps in one example carrying out the present invention.

The preparation of microchips with biomolecule arrays is schematically illustrated in FIG. 1. The first step is the ionization 11 of the proteins or biomolecules contained in the sample mixture liquid solution 10 (or in other cases, the solid materials). The molecules can be ionized by electrospray ionization (ESI), matrix-assisted laser disorption ionization (MALDI) or other well known ionization methods. The ions are then separated 12 based on their mass/charge ratio or their mobility or both their mass/charge ratio and mobility. For example, the ions can be accumulated in an ion storage device such as a quadrupole ion trap (Paul trap, including the variants known as the cylindrical ion trap [2] and the linear ion trap [3]) or an ion cyclotron resonance (ICR) trap. Either within this device or using a separate mass analyzer (such as a quadrupole mass filter or magnetic sector or time of flight), the stored ions are separated based on mass/charge ratios. Additional separation might be based on mobility using ion drift devices or the two processes can be integrated. The separated ions are then deposited on a microchip or substrate 13 at individual spots or locations 14 in accordance with their mass/charge ratio or their mobility to form a microarray. To achieve this, the microchip or substrate is moved or scanned in the x-y directions 16 and 17, and stopped at each spot location for a predetermined time to permit the deposit of a sufficient number of biomolecules to form a spot having a predetermined density. Alternatively, the gas phase ions can be directed electronically or magnetically to different spots on the surface of a stationary chip or substrate. The molecules are preferably deposited on the surface with preservation of their structure, that is, they are soft-landed. Two facts make it likely that dissociation or denaturation on landing can be avoided. First, large ions are much less likely to dissociate or undergo isomerization (denaturation) than smaller ions because of their lower velocities and greater numbers of degrees of freedom, and, second, prior evidence exists that gentle deposition can be achieved (Feng, B, et al., *J. Am. Chem. Soc.* 121 (1999) 8961-8962). Suitable surfaces for soft-landing are chemically inert surfaces which can efficiently remove vibrational energy during landing, but which will allow spectroscopic identification. Surfaces which promote neutralization, rehydration or having other special characteristics might also be used for protein soft-landing.

Figure 2:
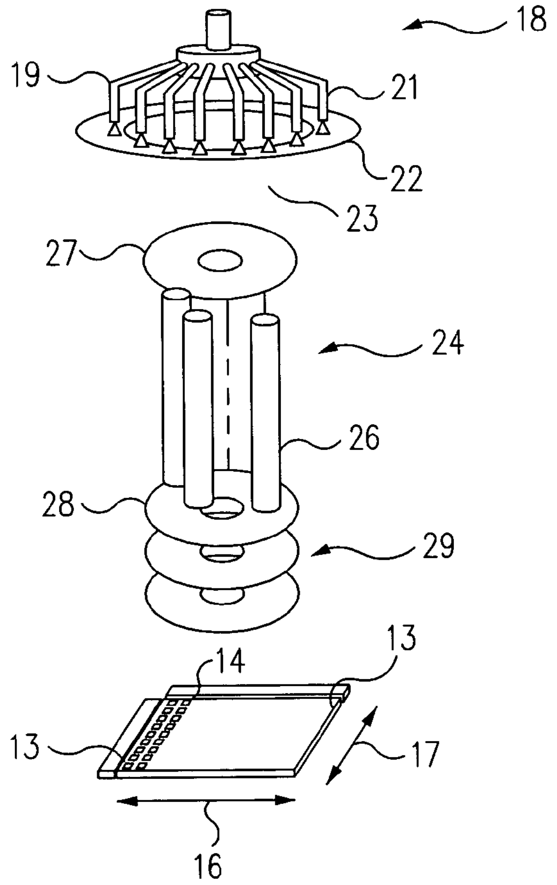
FIG. 2 is a schematic view of a mass analyzer system for carrying out the present invention.

As briefly described above, a mass spectrometer can be used to separate the sample ions according to their mass/charge ratio. A system 18 in accordance with the invention is schematically illustrated in FIG. 2. The sample is applied to a multiplexed electrospray ion source 19 [1]. The biomecules leaving the nanospray nozzles 21 are ionized by a voltage applied between the nanospray nozzles and the member 22. The streams 23 of ionized biomolecules are fed into a single high ion capacity linear ion trap 24. The ion trap includes spaced rods 26 and end electrodes 27 and 28. As known, the ion trap can be operated to accumulate ions within the trap and then selectively excite them so they exit the trap in accordance with their mass/charge ratio. A focusing lens assembly 29 focuses the ejected biomolecule ions onto a spot 14 on the microchip 13. The lens assembly can control the ions' velocity and thus the landing energy for soft-landing. As will be presently described in greater detail, other types of mass spectrometers or analyzers can be used to separate and deposit the biomolecule ions onto the microchip. The use of multiplexed ion spray shortens the time required to accumulate a sufficient number of ions to form a spot of desired quality.

Figure 3:
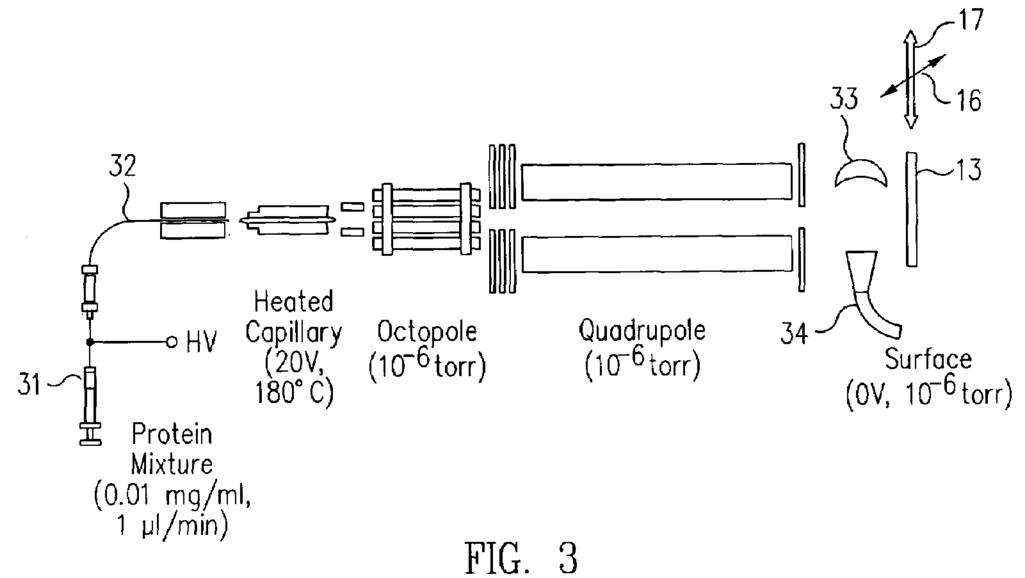
FIG. 3 is a schematic view of a mass spectrometer instrument used in soft landing components of a protein mixture.

In one example proteins and biomolecules were soft-landed using a linear quadrupole mass filter. A commercial Thermo Finnigan (San Jose, Calif.) SSQ 710C, FIG. 3, was modified by adding an electrospray ionization (ESI) source. The source included a syringe 31 which introduced the protein mixture into the capillary 32. A high voltage (HV) was applied between the capillary 32 and the ionization chamber (not shown) for electrospray ionization. The various chambers (not shown) and elements of the instrument and their pressures are schematically shown and identified in FIG. 3. The microarray plate 13 was mounted for x-y movement in the last evacuated chamber. An x-y microarray plate drive is not shown since its construction is well within the skill of those practicing the art. In one example a flow rate of 0.5 μl/min was used throughout the experiments. The surface for ion landing was located behind the detector assembly. In the ion detection mode, the high voltages on the conversion dynode 33 and the multiplier 34 were turned on and the ions were detected to allow the overall spectral qualities, signal-to-noise ratio and mass resolution over the full mass range to be examined. In the ion-landing mode, the voltages on the conversion dynode and the multiplier were turned off and the ions were allowed to pass through the hole in the detection assembly to reach the gold surface of the plate 13. The surface was grounded and the potential difference between the source and the surface was 0 volts.

To demonstrate preparative separation using mass spectrometry, a mixture of three proteins, cytochrome c. lysozyme, and apomyoglobin, was subjected to electrospray ionization (ESI). Individual ions were isolated using the SSQ-710C (ThermoFinnigan, San Jose, Calif.) mass spectrometer. The pure proteins were collected via ion soft-landing. In each case, the mass selection window was 5 mass/charge units; the unit of mass to charge ratio will be reported using the Thomson (Th) where 1 Th=1 mass unit/unit charge [10]. The landed proteins were re-dissolved by rinsing the surface with a 1:1 methanol:$H_2O$ (v/v) solution. The rinse solutions were examined using an LCQ Classic (ThermoFinnigan, San Jose, Calif.) mass spectrometer.

Solutions were prepared by mixing 100 μL 0.02 mg/mL cytochrome c (Sigma-Aldrich, St. Louis, Mo.) in 1:1 methanol: $H_2O$ (v/v), 200 μL 0.01 mg/mL lysozyme (Sigma-Aldrich, St. Louis, Mo.) in 1:1 methanol: $H_2O$ (v/v), 200 μL 0.05 mg/mL apomyoglbin (Sigma-Aldrich, St. Louis, Mo.) in $H_2O$.

A gold substrate (20 mm×50 mm, International Wafer Service) was used for the ion soft-landing. This substrate consisted of a Si wafer with 5 nm chromium adhesion layer and 200 nm of polycrystalline vapor deposited gold. Before it was used for ion landing, the substrate was cleaned with a mixture of $H_2SO_4$ and $H_2O_2$ in a ratio of 2:1, washed thoroughly with deionized water and absolute ethanol, and then dried at 150° C. A Teflon mask, 24 mm×71 mm with a hole of 8 mm diameter in the center, was used to cover the gold surface so that only a circular area with a diameter of 8 mm on the gold surface was exposed to the ion beam for ion soft-landing of each mass-selected ion beam. The Teflon mask was also cleaned with 1:1 MeOH:$H_2O$ (v/v) and dried at elevated temperature before use. The surface and the mask were fixed on a holder and the exposed surface area was aligned with the center of the ion optical axis.

For each protein, an ion soft-landing period of 90 minutes was used. Between each ion-landing, the instrument was vented, the Teflon mask was moved to expose a fresh surface area, and the surface holder was relocated to align the target area with the ion optical axis. The syringe was reloaded with the protein mixture solution and the ESI conditions were adjusted before ion landing by monitoring the spectral qualities in the detection mode. The voltage applied on the syringe tip varied: −7 kV was used for cytochrome C, −4.9 kV was used for lysozyme, and −5.2 kV was used for apomyoglbin.

Figure 4:
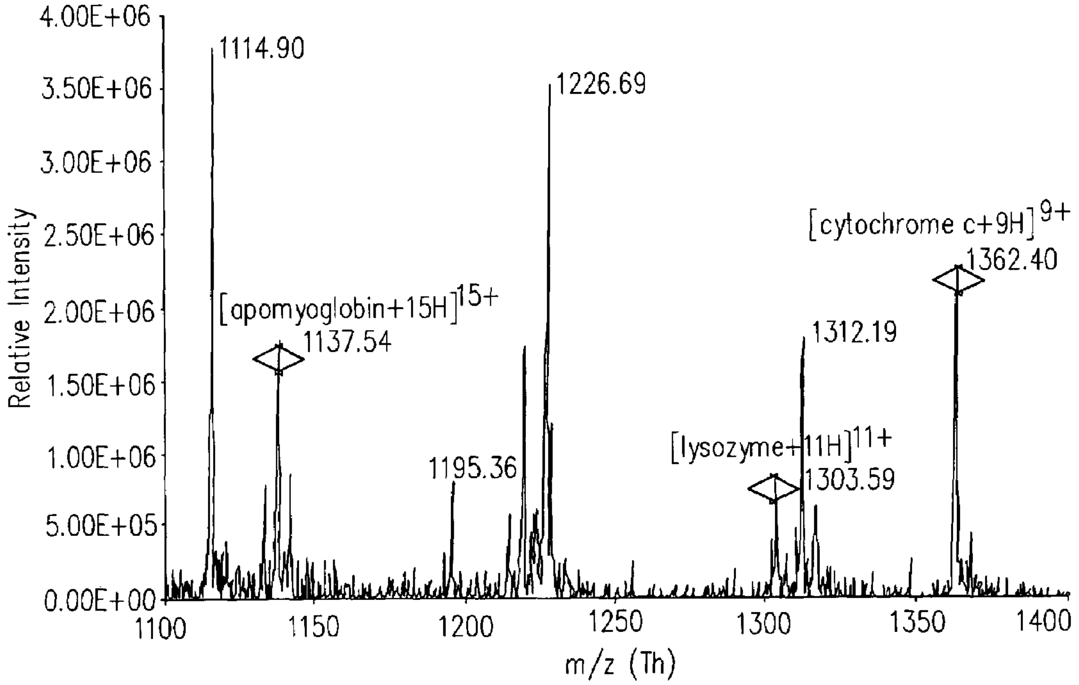
FIG. 4 is the mass spectrum of a mixture of cytochrome c, lysozyme, and apomyoglobin showing ions of various charge states; diamonds were selected for deposition.

FIG. 4 shows the ESI mass spectrum of the mixture of cytochrome c, lysozyme, and apomyoglobin. The ions of +9 charge state of cytochrome c (1360 Th; chemical average mass), +11 charge state of lysozyme (1301 Th), and +15 charge state of apomyoglobin (1131 Th) were selected individually for ion soft-landing. A mass isolation window of 5 Th centered at the mass-to-charge ratio of the isolated ion was used. The mass ranges selected on the SSQ 710C (Thermo Finnigan, San Jose, Calif.) for the three proteins were as follows: 1360-1365 Th for cytochrome c; 1300.5-1305.5 Th for lysozyme; and 1135-1140 Th for apomyogolbin.

After soft-landing, the Teflon mask was removed from the surface and the three exposed areas were rinsed with 1:1 methanol/$H_2O$ (v/v) solution. Each area was rinsed twice with 50 μl solution. The rinse solutions were analyzed using a LCQ Classic with loop injection (5 μl). The apomyoglobin solution was acidified before analysis.

Figure 5A:
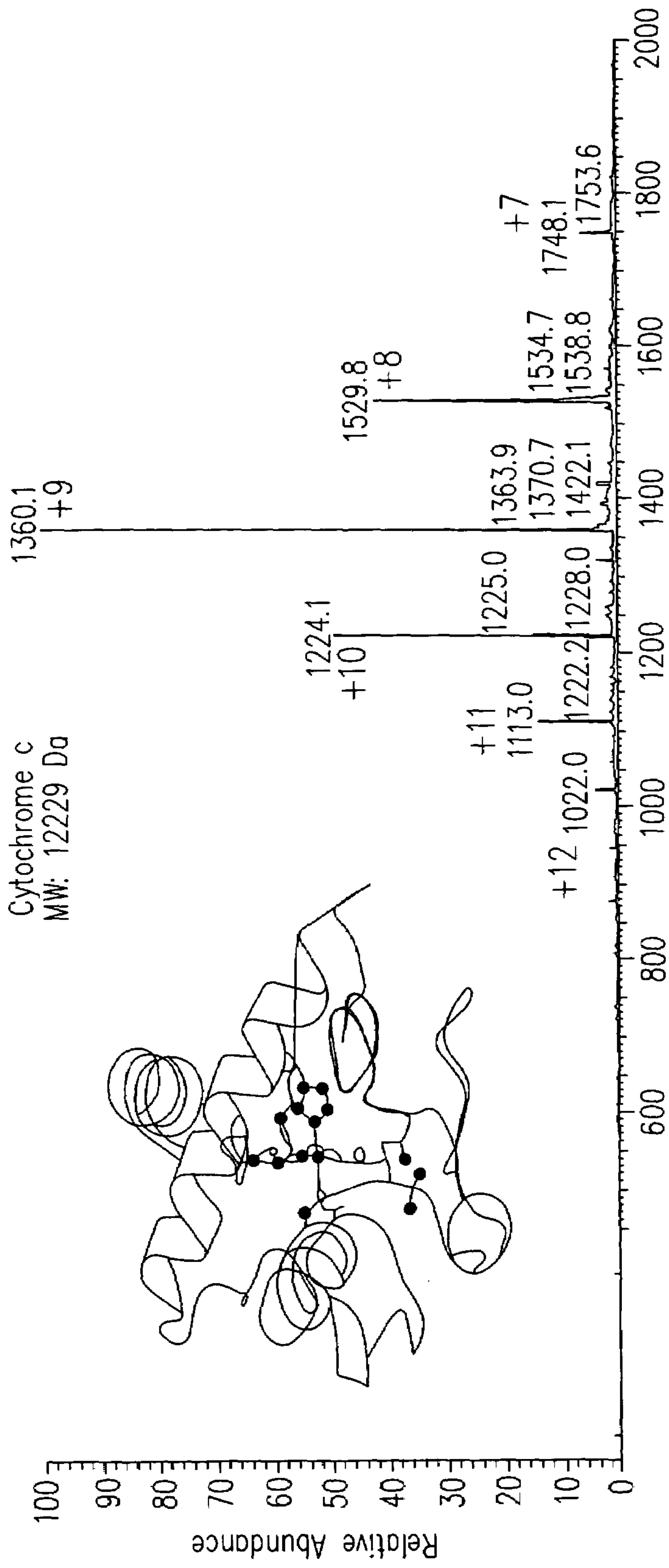
(FIG. 5A); lysozyme +11 (FIG. 5B) and apomyoglbin +15 (FIG. 5C).
Figure 5B:
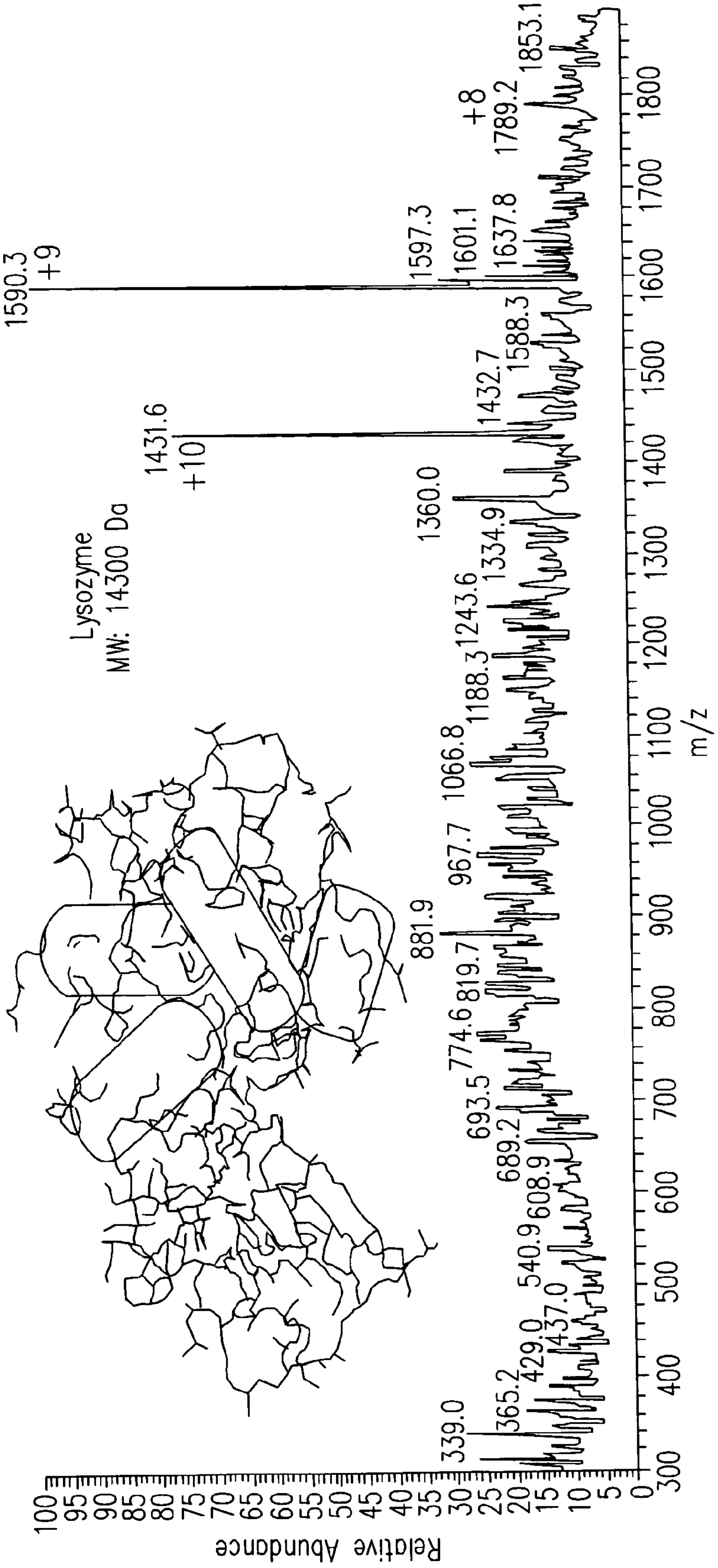
FIG. 5 shows the spectra of rinse solutions from surface areas exposed to cytochrome c +9.
Figure 5C:
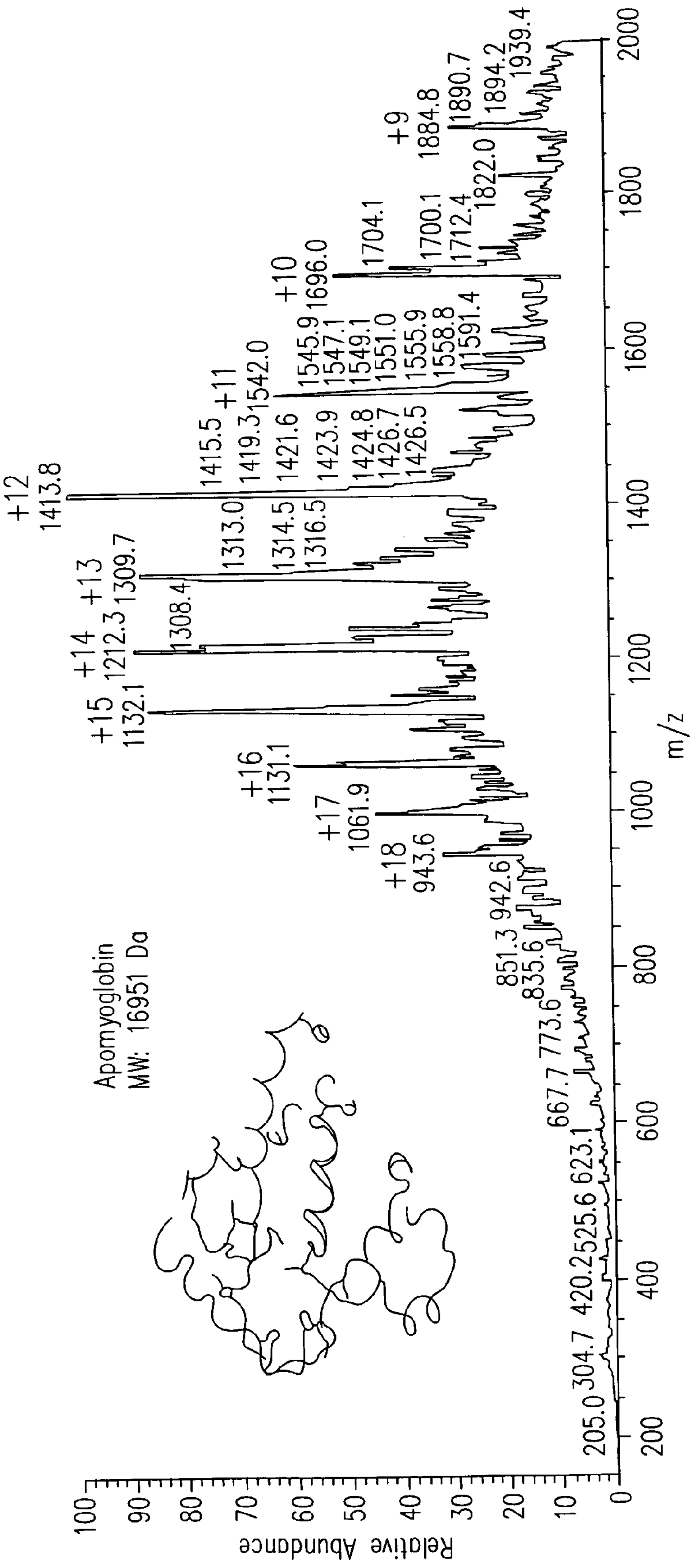

FIG. 5 shows the spectra recorded from the analysis of the rinse solutions. From the solutions obtained from rinsing the surface area exposed to cytochrome c +9, the ions corresponding to cytochrome c charge states of +7 to +12 were observed (FIG. 5*a*); the ions corresponding to lysozyme charge states +8 to +10 were found in the rinse solutions for the surface area exposed to lysozyme +11 (FIG. 5*b*); and the ions[5] corresponding to apomyoglobin charge states +9 to +18 were observed in the rinse solutions for the surface area exposed to apomyoglobin +15 (FIG. 5*c*).

Four conclusions can be drawn from this experiment: 1. Proteins can be collected on surfaces by ion soft-landing using mass-selected ions; 2. Each rinse solution contained only the protein which was selected and landed on the surface, indicating that the ions have been well separated from other ionic or neutral species in the gas phase; 3. Only molecular ions were observed in the rinse solution, which means the ion soft-landing is capable of retaining the intact protein molecular structure; and 4. The fact that the mass spectra show a distribution of charge states, not just the particular state soft-landed, indicates that the protein is neutralized on landing on the surface or after re-solvation.

Figure 6A:
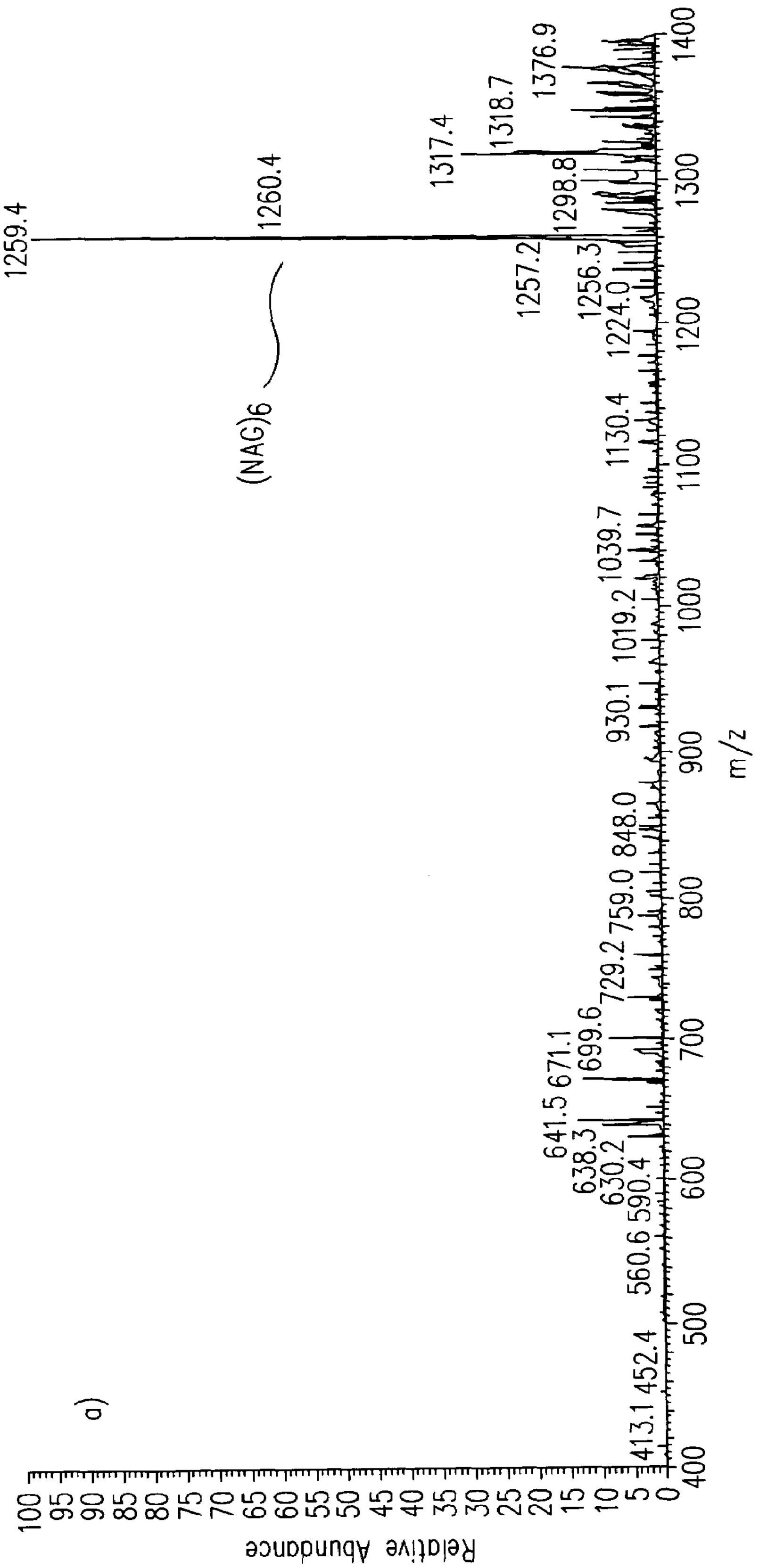
FIGS. 6A and 6B show the spectrum of rinse solutions containing hexa-N-acetyl chitohexaose, and spectrum of digested product of hexa-n-actylchitohexaose by soft-landed lysozme.
Figure 6B:
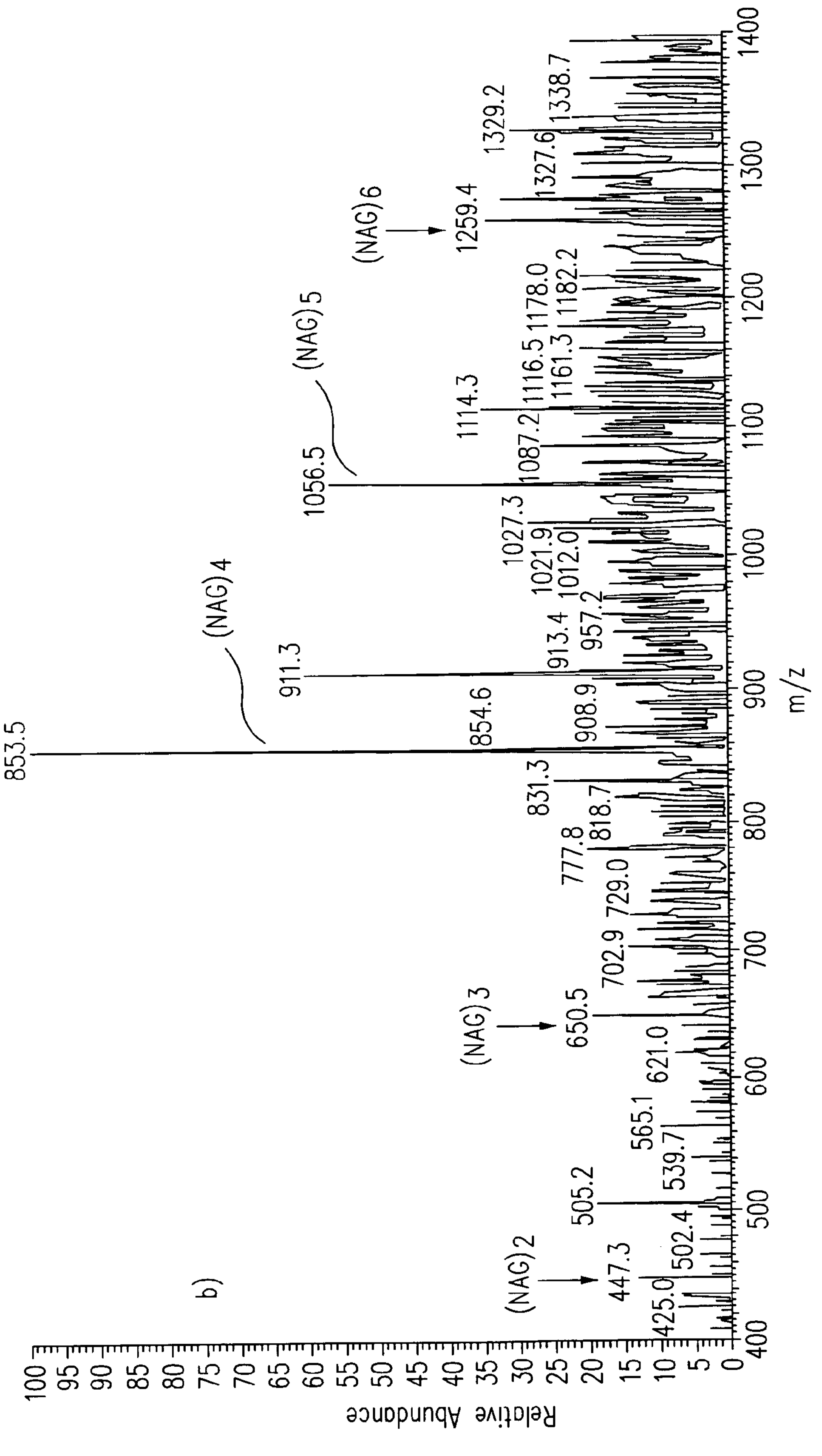

Bioactivity of the landed lysozyme was tested by using hexa-N-actyl chitohexoase as substrate. $[Lysozyme+8H]^{8+}$ was landed for 4 hours on a Au target using the experimental conditions described above. The surface was rinsed using 1 μM hexa-N-acetyl chitohexaose solution containing 2 mM Na+ at a pH of 7.8. The solution was incubated at +38° for 2.5 h and was analyzed using the LCQ instrument in the positive ion ESI mode. Spectra of the original solution and the digestion product are shown on FIGS. 6A and 6B.

While the spectrum of the original substrate solution shows only the presence of the hexa-N-acetyl-chitohexaose, the spectrum of the digestion product shows an intense sodiated molecular ion of the tetra-N-acetyl-chitotetraose and other N-acetyl-glucosamine oligomers which are the cleveage products from the enzymatic digestion of substrate. Four conclusions can be drawn from these experiments: 1) The protein ions mass selected by the mass analyzer have been collected through ion soft-landing on the surface; 2) each rinse solution contained only the protein corresponding to the ions selected to land on the surface, which indicates that the ions have been well separated from other ionic or neutral species in the gas phase; 3) only intact molecular ions were observed in the rinse solution, which means the ion soft-landing is capable for retaining the protein molecular structures; and 4) soft-landed lysozyme was able to cleave hexa-N-acetyl-chitohexaose producing tetra-N-acetyl-chitotetraose indicating normal enzymatic activity of this protein.

To provide further experimental evidence that soft-landed proteins retain bioactivity, a mixture of two enzymes, trypsin and lysozyme, were separated in a SSQ-710C (ThermoFinnigan, San Jose, Calif.) mass spectrometer and the pure proteins were collected via ion soft-landing. Two blank samples were generated by landing ions in the mass/charge region from 200 Th to 210 Th, a region that does not contain protein ions. The same instrumental parameters were used as in the case of the experiments, described above. A mixture solution was prepared by mixing 200 μL 0.1 mg/mL lysozyme (Sigma-Aldrich, St. Louis, Mo.) in 1:1 MeOH:$H_2O$ (v/v) and 0.01 mg/mL trypsin in 1:1 MeOH:$H_2O$ containing 1% AcOH.

Figure 7A:
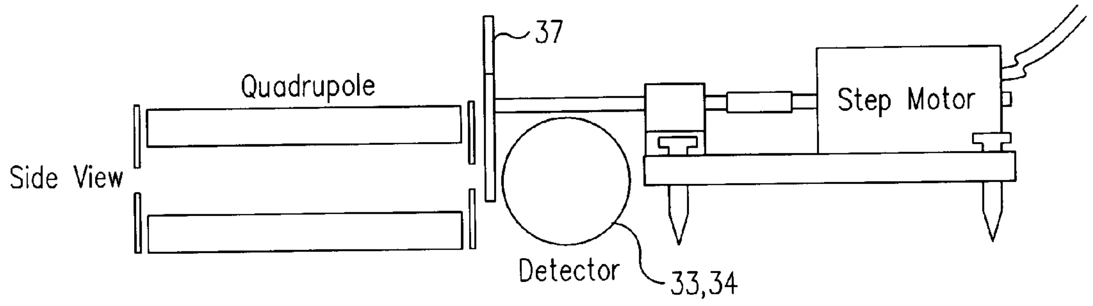
FIGS. 7A and 7B show a rotable disk for monitoring surfaces for receiving soft-landed ions and a drive motor.
Figure 7B:
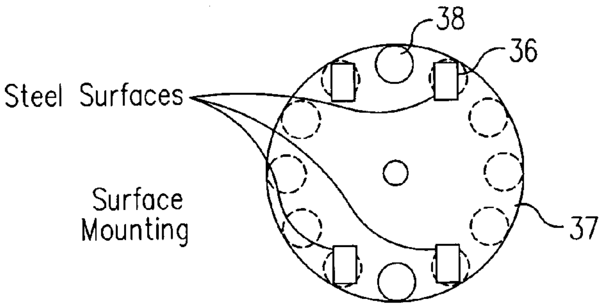

Four 10 mm×5 mm steel plates 36 were mounted on a rotatable steel disk 37 having openings 38 which was connected to a step motor 39, as it is shown on FIGS. 7A and 7B. The detector 33, 34 was mounted behind the disk and detected ions traveling through the openings 38.

$[Lysozyme +8H]^{8+}$, $[Trypsin+12H]^{12+}$ ions and two blanks were landed on four separate steel plates by changing the mass window and rotating the disk between the landing sessions. Each session was 3 hours long. The instrument was not vented between depositions. Bioactivity of landed lysozyme was tested by pipetting 10 μL 1 μM hexa-N-acetyl chitohexaose solution containing 2 mM $Na^+$ at pH of 7.8 onto the plate carrying landed lysozyme and one of the blank plates. The system was incubated at 37° C. for 4 hours. The evaporated solvent was supplemented continuously. After 4 hours, 2 μL 3% 2,5-dihydroxy benzoic acid in MeOH:$H_2O$ 1:2 was added and the solvent was evaporated to dryness.

Figure 8A:
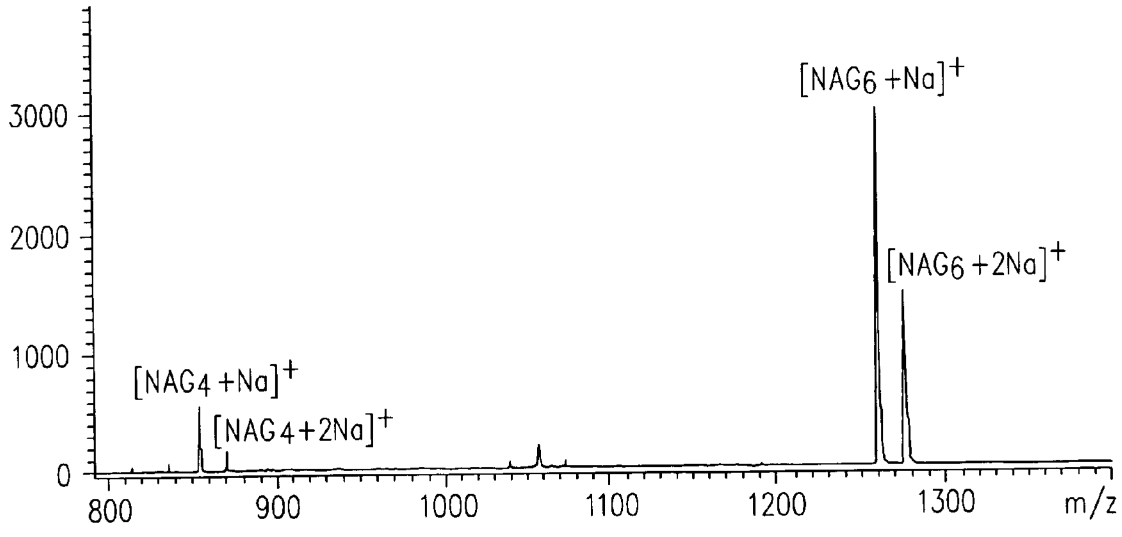
FIG. 8A shows the spectrum for the soft-landed hex-N-acetyl chitohexaose ($NAG_6$) and its cleavage product, tetra-N acetyl—chitotetraose detected by MALDI-TOF on the surface carrying soft-landed lysozme.
Figure 8B:
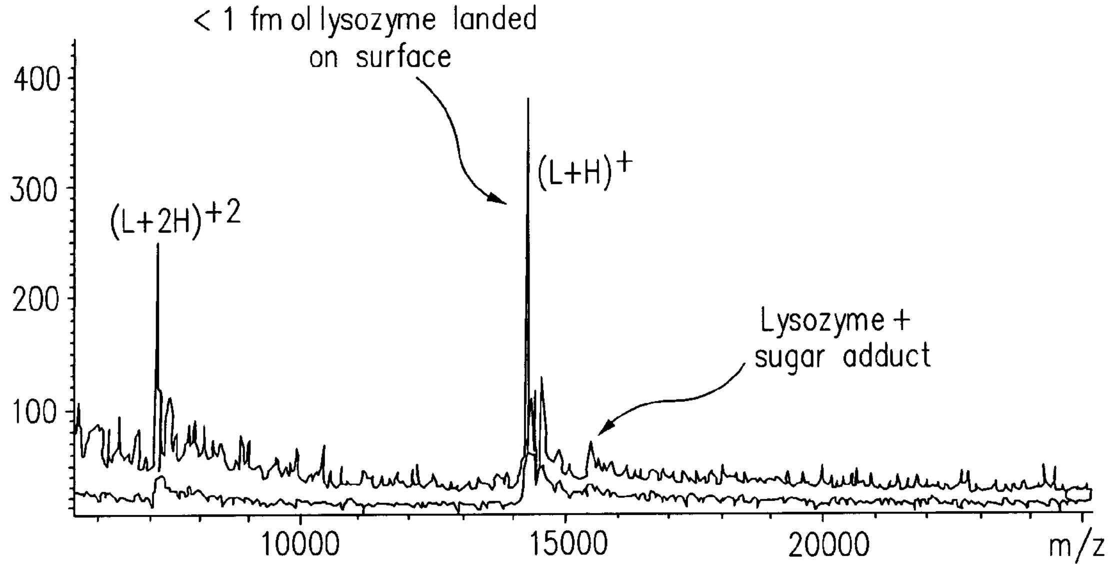
FIG. 8B shows the spectrum for soft-landed lysozme on the surface detected by MALDI-TOF.

The plate was transferred into a Bruker Reflex III MALDI-TOF mass spectrometer and MALDI data was collected in the reflectron mode (FIG. 8A) in the low mass range, and in the linear mode in the high mass range. (FIG. 8B) The low-mass MALDI spectra show both the sodiated molecular ion of the substrate and the cleavage product. The high mass MALDI spectrum shows the singly and doubly charged ions of intact enzyme and the enzyme-substrate complex.

Figure 9:
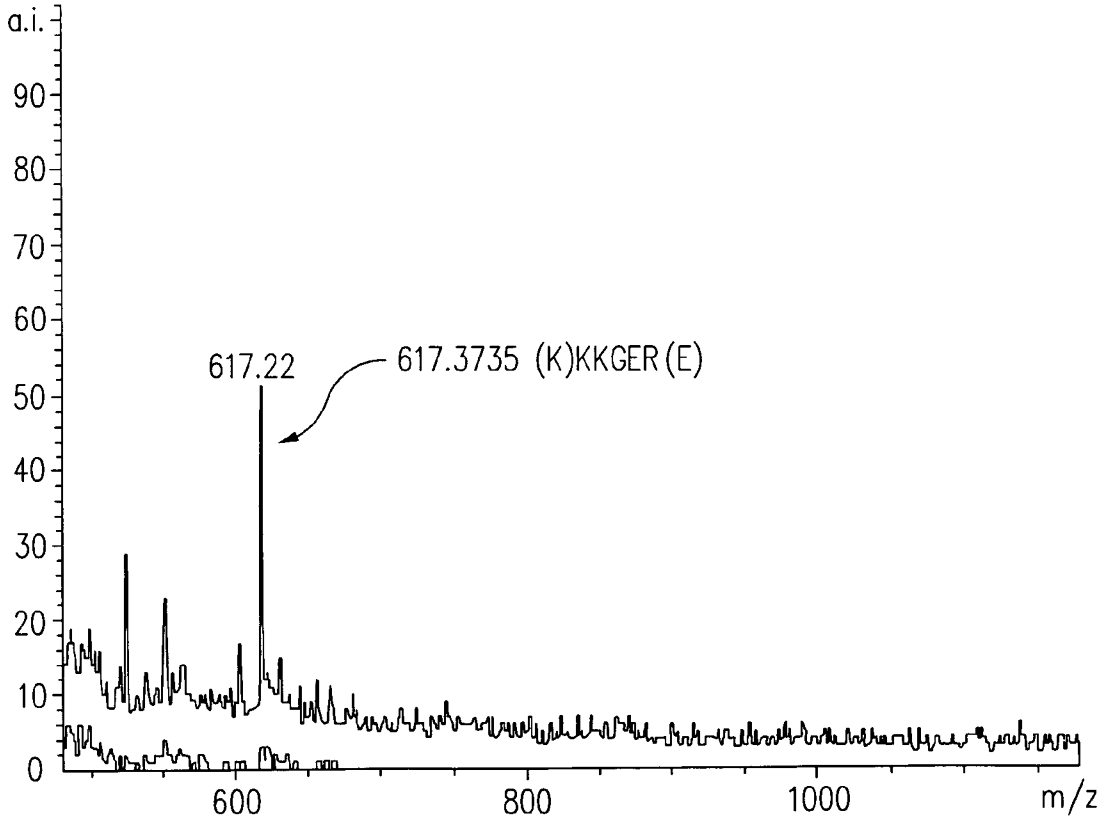
FIG. 9 shows the spectrum of characteristic tryphic fragment of cytochrome C detected on a surface carrying soft-landed trypsim.

The bioactivity of landed trypsin was tested by pipetting 10 μL 1 μM cytochrome C solution in 10 mM aqueous $NH_4CO_3$ onto the plate carrying the landed trypsin and onto the blank. The system was incubated at 37° C. for 4 hours. The evaporated solvent was supplemented continuously. After 4 hours 2 μL saturated α-cyano-3-hydroxy-cinnamic acid in ACN:$H_2O$ 1:2 (containing 0.1% TFA) was added and the solvent was evaporated to dryness. The plate was transferred into a Bruker Reflex III MALDI-TOF mass spectrometer and MALDI data was collected in reflectron mode (FIG. 9.). Characteristic tryptic fragments of cytochrome C were detected.

Figure 10:
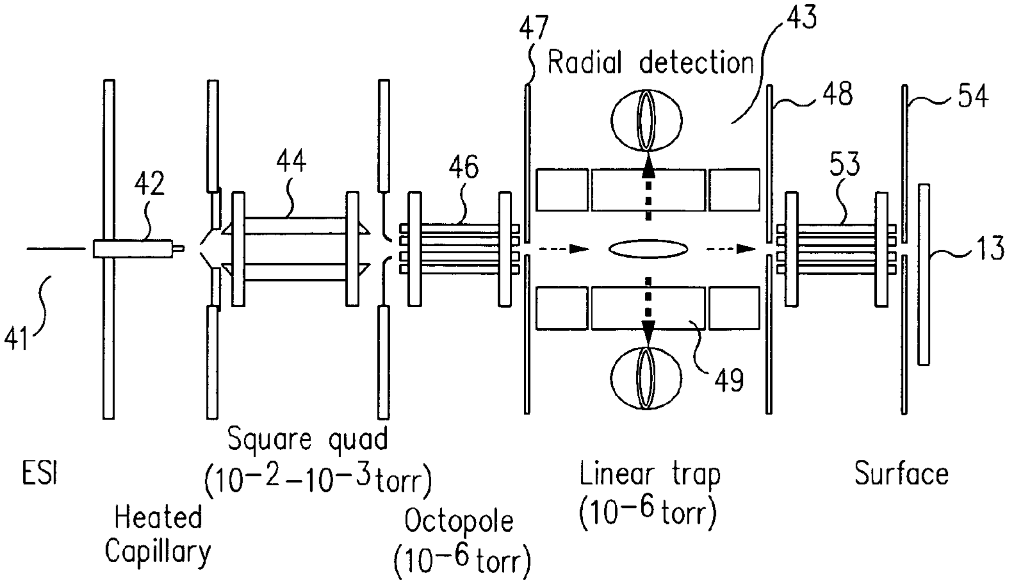
FIG. 10 is a schematic of another instrument which includes a linear ion trap.
Figure 11A:
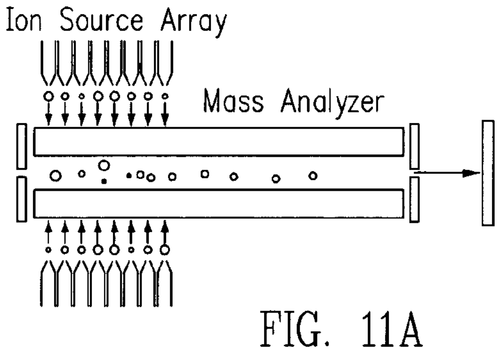
FIG. 11A-D show configurations of multi-source ionization with linear ion traps.
Figure 11B:
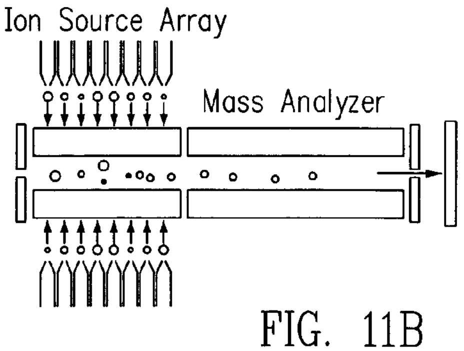
Figure 11C:
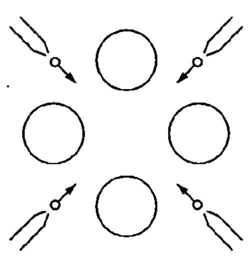
Figure 11D:
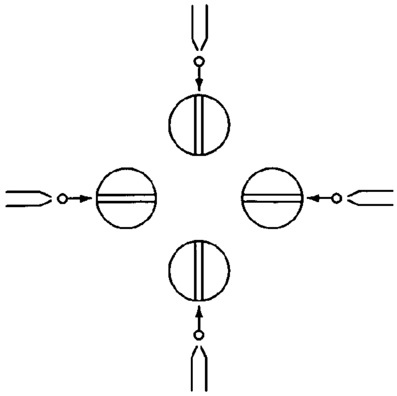

In another embodiment a linear ion trap can be used as a component of a soft-landing instrument. A Schematic representation of a soft-landing instrument is presented in FIG. 10. The instrument includes an ion source [41] such as an ESI source at atmospheric pressure. Ions travel through a heated capillary [42] into a second chamber via ion guides 44, 46 in chambers of increasing vacuum. The ions are captured in the linear ion trap 43 by applying suitable voltages to the electrodes 47 and 48 and RF and DC voltages to the segments of the ion trap rods 49. The stored ions can be radially ejected for detection. Alternatively, the ion trap can be operated to eject the ions of selected mass through the ion guide 53, through plate 54 onto the microarray plate 13. The plate can be inserted through a mechanical gate valve system, not shown, without venting the entire instrument.

The advantages of the linear quadrupole ion trap over a standard Paul ion trap include increased ion storage capacity and the ability to eject ions both axially and radially. Linear ion traps give unit resolution to at least 2000 Thomspon (Th) and have capabilities to isolate ions of a single mass/charge ratio and then perform subsequent excitation and dissociation in order to record a product ion MS/MS spectrum. Mass analysis will be performed using resonant waveform methods. The mass range of the linear trap (2000 Th or 4000 Th but adjustable to 20,000 Th) will allow mass analysis and soft-landing of most biomolecules of interest.

In the soft-landing instrument described above the ions are introduced axially into the mass filter rods or ion trap rods. FIG. 2 illustrates a suitable axial multiplexed electrospray ion source. The ions can also be radially introduced into the linear ion trap.

A multiplexed nano-electrospray ion source with each of the tips feeding radially into a single high ion capacity linear ion trap is illustrated in FIGS. 11A, 11B, 11C and 11D. This arrangement is selected because nanospray ionization is highly efficient, much more so than the higher flow micro-electrospray method. The figures show two possible source/analyzer arrangements. In one, FIG. 11A, the source is simply a part of the linear ion trap analyzer into which ions are injected. In the other, FIG. 11B, the source is a separate device but it is operated using the same rf ion trapping voltage as the analyzer and its dc potential is set so as to provide axial trapping. Two methods of introducing ions are also shown, one (FIG. 11D) involves cutting slits into the electrodes and spraying electrons through the slits and the other (FIG. 11C) involves spraying ions between the electrodes.

Figure 12:
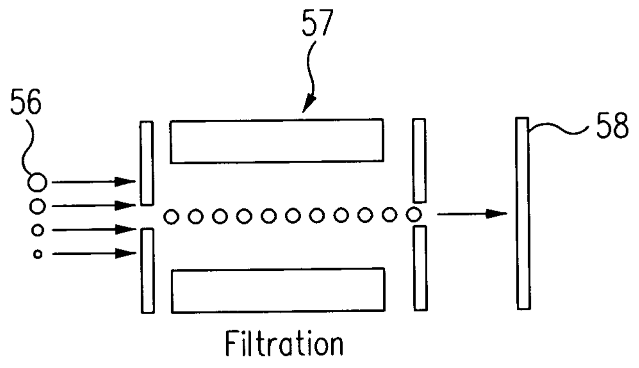
FIG. 12 illustrates separation by filtering for ions of particular mass/charge ratios.

Methods of operating the above described soft-landing instruments and other types of mass analyzers to soft-land ions of different masses at different spots on a microarray are now described. Referring to the schematic diagram of FIG. 12 which illustrates the rods of an instrument such as that shown in FIGS. 2 and 3 operated as a mass filter. The ions 56 of the protein mixture are introduced into the mass filter 57. Ions of selected mass-to-charge ratio will be mass-filtered and soft-landed on the substrate 58 for a period of time. The mass-filter settings then will be scanned or stepped and corresponding movements in the position of the substrate will allow deposition of the ions at defined positions on the substrate 58.

Figure 13:
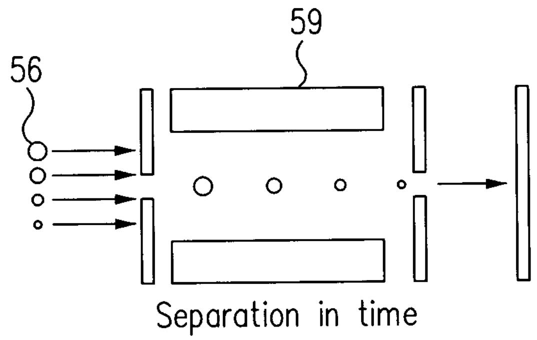
FIG. 13 illustrates separation by time in which ions of different mass/charge ratios all pass through the analyzer.

The ions 56 can be separated in time so that the ions arrive and land on the surface at different times. While this is being done the substrate is being moved to allow the separated ions to be deposited at different positions. A spinning disk is applicable, especially when the spinning period matches the duty cycle of the device. The applicable devices include the time-of-flight and the linear ion mobility drift tube 59 schematically illustrated in FIG. 13. The ions can also be directed to different spots on a fixed surface by a scanning electric or magnetic fields.

Figure 14A:
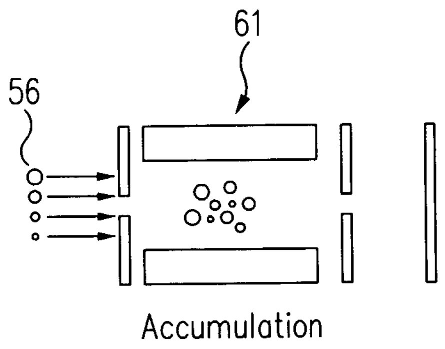
FIGS. 14A and 14B illustrates accumulation followed by separation with selective ejection.
Figure 14B:
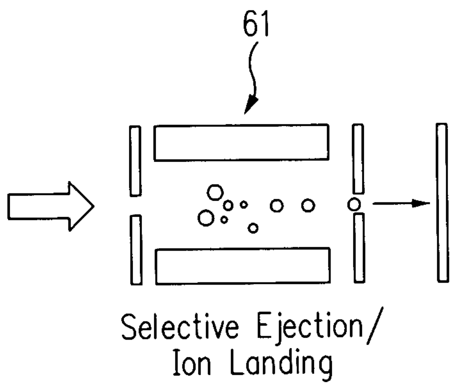
Figures 15A, 15B, 15C:
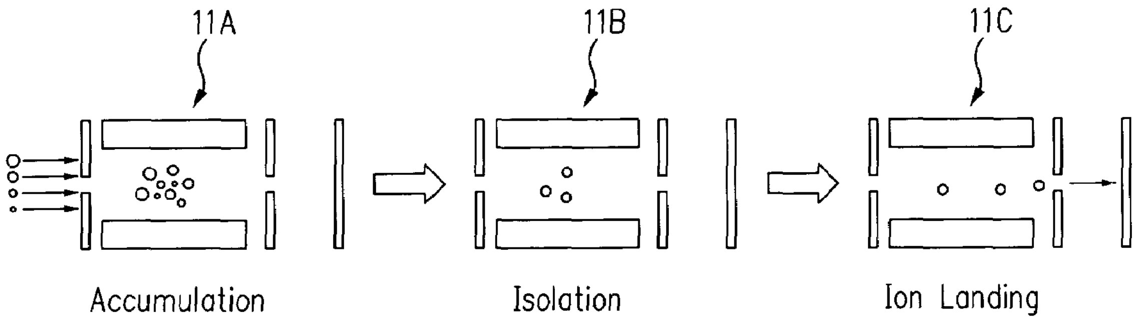
FIG. 15 A-C illustrates accumulation followed by isolation followed by soft landing.
Figure 16:
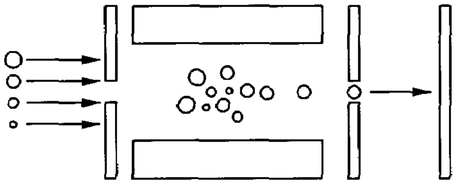
FIG. 16 illustrates simultaneous operation of accumulation and selective ejection and soft landing.

In another embodiment, FIG. 14, the ions 56 can be accumulated and separated using a single device 61 that acts both as an ion storage device and mass analyzer. Applicable devices are ion traps (Paul, cylindrical ion trap, linear trap, or ICR). The ions are accumulated followed by selective ejection of the ions for soft-landing, FIGS. 14A and 14B respectively. The ions 56 can be accumulated, isolated as ions of selected mass-to-charge ratio, and then soft-landed onto the substrate 58. This is illustrated in FIGS. 15A, 15B and 15C. Ions can be accumulated and landed simultaneously. In another example, FIG. 16, ions of various mass-to-charge ratios are continuously accumulated in the ion trap while at the same time ions of a selected mass-to-charge ratio can be ejected using SWIFT and soft-landed on the substrate 58.

Figure 17:
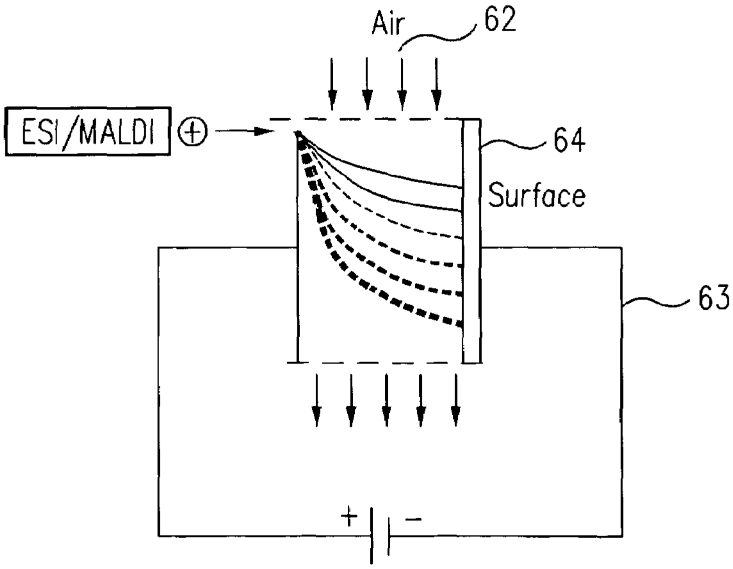
FIG. 17 illustrates separation of ions based on mobility.

In a further embodiment of the soft-landing instrument ion mobility is used as an additional (or alternative) separation parameter. As before, ions are generated by a suitable ionization source such as an ESI or MALDI source. The ions are then subjected to pneumatic separation using a transverse air-flow and electric field. A soft-landing instrument is shown in FIG. 17. The ions move through a gas in a direction established by the combined forces of the gas flow 62 and the force applied by the electric field 63. Ions are separated in time and space. The ions with the higher mobility arrive at the surface 64 earlier and those with the lower mobility arrive at the surface later at spaces or locations on the surface.

The instrument can include a combination of the described devices for the separation and soft-landing of ions of different masses at different locations. Two such combinations include ion storage (ion traps) plus separation in time (TOF or ion mobility drift tube) and ion storage (ion traps) plus separation in space (sectors or ion mobility separator).

It is desirable that protein conformation and bio-activity be retained. A combination of strategies may be employed. One is to keep the deposition energy low to avoid dissociation or transformation of the biological ions when they land. This needs to be done while at the same time minimizing the spot size. Two facts make it likely that dissociation on landing can be avoided: first, large ions are much less likely to dissociate or undergo isomerization (e.g. protein denaturation) than smaller ions because of their lower velocities and the greater numbers of degrees of freedom into which energy can be partitioned, and second, prior evidence exists that gentle deposition can be achieved. Another strategy is to mass select and soft-land an incompletely desolvated form of the ionized biomolecule. Extensive hydration is not necessary for biomolecules to keep their solution-phase properties in gas-phase. Hydrated biomolecular ions can be formed by electrospray and separated while still "wet" for soft-landing. The substrate surface can be a "wet" surface for protein soft-landing, this would include a surface with as little as one monolayer of water. Alternatively, it can be a surface such as dextran in which proteins are stabilized by hydroxyl functional groups. Another strategy is to hydrate the protein immediately after mass-separation and prior to soft-landing. Several types of mass spectrometers, including the linear ion trap, allow ion/molecule reactions including hydration reactions. It might be possible to control the number of water molecules of hydration. Still further strategies are to deprotonate the mass-selected ions using ion/molecule or ion/ion reactions after separation but before soft-landing, to avoid undesired ion/surface reactions or protonate at a sacrificial derivatizing group which is subsequently lost.

Figure 18:
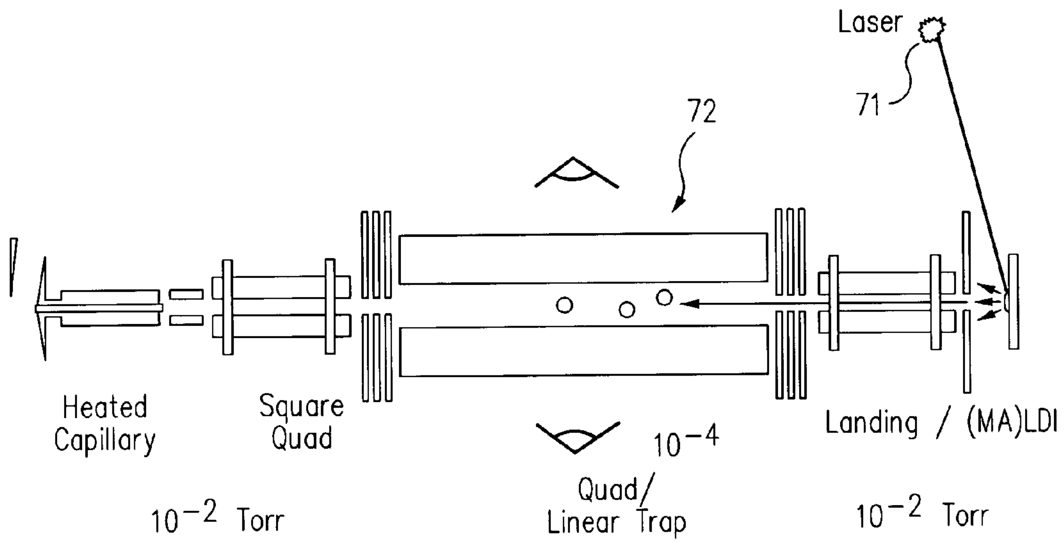
FIG. 18 is a schematic diagram of an instrument showing the collected samples on the surface being ionized by a laser with the released ions being injected back into the mass spectrometer for analysis.
Figure 19:
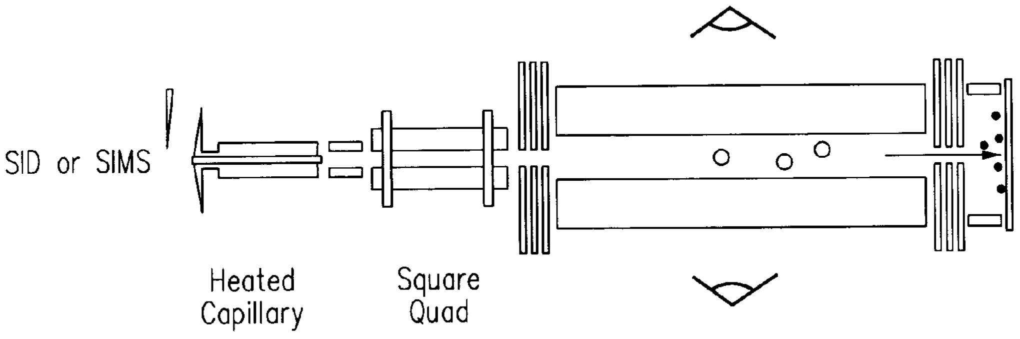
FIG. 19 shows an instrument in which the proteins/peptides are trapped, isolated and then ejected to soft land onto a surface, and after a short delay they may be injected back into the instrument for mass analysis.

Different surfaces are likely to be more or less well suited to successful soft-landing. For example, chemically inert surfaces which can efficiently remove vibrational energy during landing may be suitable. The properties of the surfaces will also determine what types of in situ spectroscopic identification are possible. The protein ions can be soft-landed directly onto substrates suitable for MALDI. Similarly, soft-landing onto SERS-active surfaces should be possible. In situ MALDI and secondary ion mass spectrometry can be performed by using a bi-directional mass analyzer such as a linear trap as the mass analyzer in the ion deposition step and also in the deposited material analysis step. This is illustrated in FIG. 18 which shows a soft-landing instrument as in FIG. 10. The array of soft-landed proteins on the substrate are excited by laser 71 and directed back into the linear ion trap 72 where they are analyzed. The instrument can be applied to protein SID with little modification, as illustrated in FIG. 19. The proteins/peptides are trapped, isolated, and then ejected to collide onto the surface. After a short delay (as in TOF-surface-TOF instruments), the fragments are injected into the linear trap again for mass analysis.

In summary, in the present system and method, sample molecules in a mixture of proteins or other molecules are ionized, separated in the gas phase as ions of different masses and deposited or soft-landed on a substrate where they are stored for later processing or analysis. They can be separated by their m/z (Th) or their mobility or both and collected as charged or neutral, pure or impure species. During the gas phase separation, the species to be separated can be in the form of molecules or clusters of molecules. The species can be soft-landed or collected as a charged species or neutral species, with or without retention of any prior bioactivity. The separated species can be collected on a surface in an array of discrete spots or in a continuous trace. They can be mobile or immobilized on the surface. The separated species can also be collected in a liquid. Various separation mechanisms, some of which have been described, can be employed. These include filtering (quadruple mass spectrometer, selected ion monitoring mode for other devices), separation in time (TOF, Ion trap, IMS, ICR, etc.) and separation in space (sector, IMS, TOF, etc.). The species can be separated and then collected or collected while it is being separated. The present system and method can also be used to carry out micro scale reactions: soft-landing onto a small region and then landing a second species on top or soft-landing onto a small region of a chemically active surface or soft-landing followed by addition of a reagent to some or all of the collected material in the assay of spots.

This is a unique method that uses mass spectrometry instead of chromatography for preparative scale separation. It is also an alternative to methods in which arrays are built up synthetically by jet micro-drop or related methods in which reagents are mixed in combinations that allow deposition of specific compounds (typically oligonucleotides) at certain points in the array. Many potentially important applications for the soft-landing instrument should emerge. These include the creation of micro-arrays of proteins (and other compounds) from complex biological mixtures without isolation of pure proteins or even knowledge of their structures. These separated proteins on the array could be interrogated using standard affinity binding and other tests of biological or pharmacological activity.

In general, soft-landing offers new ways of interrogating and recognizing biomolecules in pure form with the possibility of storage and later re-measurement of samples. These experiments will lead to highly sensitive detection/identification, e.g. activity assays, using surface-based spectroscopic methods, including Raman spectroscopy. Note that separation by mass spectrometry of proteins from complex mixtures (e.g. serum, plasma) is orthogonal to other separation methods and most likely advantageous when closely related groups of compounds (e.g. glycosylated forms of proteins) are to be separated. The advantages of soft-landing extend to minor protein constituents of mixtures, especially when used in conjunction with chromatographic methods like capillary electrochromatography (CEC). It is possible to foresee related-substance analysis on recombinant and post-translationally modified proteins as well as high-throughput experiments, including drug receptor screenings.

Other potential applications include: a. Reactions of extremely pure proteins with affinity and other reagents can be carried out, including enzyme/substrate and receptor/ligand reactions; b. Binding experiments: ligand/receptor identification, small molecule drug/target pair identification; c. Resolution of multiple modified forms of a protein; d. Effective analysis of biopsy materials; and e. Determination of effects of post-translational modifications on protein function.

Specific areas of application and comments on related methods:

Alternative methods of making protein chips require large amounts of highly purified proteins and are very focused on specific applications. Conventional purification techniques are not efficient. Chips with catalytically active proteins (kinases) use tagged binding, which is time consuming due to individual expression and purification steps.

Current technology makes the identification of the specific interactions of proteins in a cell with a potential drug time consuming, expensive, and difficult. Soft-landing could be used to deposit proteins from a cell individually onto a surface, incubate the surface with a drug candidate, and then analyze the spots to determine which proteins interact with the potential drug.

Soft-landing can be used to separate a large number of proteins of very similar mass (e.g. separating glycoforms or insulin from oxidized insulin), which is not allowed by conventional forms of chromatography. As a separation method, soft-landing is mass spectrometry based and hence "orthogonal" to chromatographic separations.

Soft-landing can be used to make a protein chip array of an entire cell's proteome and examine both low and high abundance proteins in one experiment. Conditions could be manipulated (deposition time) to produce spots of low-cellular abundance proteins from cells which have equal quantities to those of their celluary abundant analogs (normalization).

Currently cases exist where a protein can be purified to only approximately 90% pure; the question exists as to whether the activity of the 90% purified form is due to the protein itself or contaminants. Soft-landing could be used to make extremely pure proteins which could then be tested for activity.

Enzymes might be mass selectively separated and immobilized on a surface in arrays, leaving the active sites accessible. This kind of array could be reused for biological assays.

It might be possible to deliver both the analyte and the reagent to a localized region by soft-landing, facilitating ultra-small scale reactions. Examples could include studies of kinases and their substrates, RNA pairing, etc.

There is provided a system and method in which sample molecules in a mixture of proteins or other biochemical molecules are ionized, separated in the gas phase as ions of different masses, and deposited or soft-landed on a substrate where they are stored for later processing or analysis. More particularly, the molecules of the biological compounds, including proteins and oligonucleotides are ionized by, for example, electrospray ionization, matrix assisted laser desorption ionization or other ionizing method. The ionized molecules of the mixture are separated by a mass analyzer according to mass, mobility or both, and then soft-landed at separate positions on a substrate to form an array. The collected biomolecules at each position can then be identified and analyzed by affinity bonding or other biochemical specific processes and by laser based techniques such as surface enhanced raman spectroscopy (SERS), fluorescence, or Matrix Assisted Laser Desorption/Ionization (MALDI) analysis. They might already be known compounds (as a result of analysis by mass spectrometry for example) and could then be used as reagents in subsequent biochemical tests.

REFERENCES:

(1) Liu, H.; Felten, C,; Xue, Q.; Zhang, B.; Jedrzejewski, P.; Karger, B. L.; Foret, F., *Anal. Chem,* 2060, 72, 3303-3310.

(2) Wells, J. M.; Badman, E. R.; Cooks, R. G., *Anal. Chem.,* 1998, 70, 438-444.

(3) Schwartz, J. C.; Senko, M. W.; Syka, J. E. P., *J. Am. Soc. Mass Spectrom,* 2002, 13, 659-669.

(4), Franchetti, V.; Solka, B. H.; Baitinger, W. E.; Amy, J. W.; Cooks, R. G., *Int J. Mass Spectrom, Ion Phys.,* 1977, 23, 29-35.

(5) Miller, S. A.; Luo, H.; Pachuta, S.; Cooks, R. G., *Science,* 1997, 275, 1447.

(6) Luo, H.; Miller, S. A.; Cooks, R. G.; Panchuta, S., *J. Int. J. of Mass Spectrom, Ion Processes,* 1998, 174, 193-217.

(7) Geiger, R. J.; Melnyk, M. C.; Busch, K. L.; Bartlett, M. G., *Int. J. of Mass Spectrom,* 1999, 182/183, 415-422.

(8) Feng, B.; Wunschel, D. S.; Masselon, C. D.; Pasa-Tolic, L.; Smith, R. D., *J. Am. Chem. Soc.,* 1999, 121, 8961-8962.

(9) Bromann, K.; Felix, C.; Brune, H.; Harbich, W.; Monot, R.; Buffet, J.; Kern, K., *Science,* 1996, 274, 956-958.

(10) Cooks, R. G.; Rockwood, A. L., *Rapid Commun. Mass Spectrom,* 1991, 5, 93-93.

(11) Siuzdak, G., Bothner, B., Yeager, M., Brugidou, C., Fauquet, C., Hoey, K., Chang, C., *Chemistry and Biology,* 1996, 3, 45-48.

What is claimed is:

1. A method of separating species from a mixture of species of material and collecting individual species comprising the steps of converting the mixture to gas phase ions for each species of the mixture, separating the species of the mixture based upon the mobility of the charged species, and collecting by soft-landing each separated species at different locations on a wet substrate surface so that each separated species keeps its solution phase properties.

2. A method as in claim 1 in which the species is selected from the group consisting of molecules and atoms.

3. A method as in claim 2 in which the species is collected as a neutral species.

4. A method as in claim 2 in which the species are collected on the surface of the substrate as an array of discrete spots.

5. A method as in claims 1 in which the species is collected as a charged species.

6. A method as in claim 1 in which the species are collected in a liquid.

7. A method of preparing a microarray of molecules on a substrate from a mixture of different molecules comprising the steps of converting the molecules of the mixture of different molecules to gas phase molecular ions, separating the different molecular ions based upon the mobility of the ions, and depositing by soft landing the different molecular ions on a wet surface at different locations on the surface of the microarray substrate so that each separated different molecular ion keeps its solution phase properties.

8. A method as in claim 7 wherein the different locations are spots.

9. A method as in claim 7 wherein the different locations are along a trace.

10. A system for forming arrays of molecules from a mixture of molecules comprising:

ionizing means for converting the mixture into gas phase ions of the different molecules in the mixture, separation means for separating the ions in accordance with their mobility, a wet surface positioned in cooperative relationship with said separation means, and means for depositing by soft landing the separated molecules onto the wet surface at different locations so that each separated molecules keeps its solution phase properties.

11. A system as in claim 10 in which the ionizing means is selected from the group comprising electrospray ionization, matrix-assisted laser disorption ionization and atmospheric pressure chemical ionization.

12. A system as in claim 11 in which the separation means is selected from the group comprising a mass filter, quadropole ion trap, linear ion trap, cylindrical ion trap, ion cyclotron resonance trap, time of flight mass spectrometer, magnetic sector mass spectrometer.

13. A system as in claim 10 in which the separation means separates the ions in time.

14. A system as in claim 10 in which the separation means separates the ions in space.

15. A system as in claim 10 in which the separation means separates the ions before they are collected.

16. A system as in claim 10 in which the separation means separates the ions while they are collected.

17. A method of separating molecules of a biochemical compound which comprises the steps of converting the compound into ions of species of the compound separating the species of the compound based upon mobility of the charged ions, and collecting by soft landing the separated species on a wet surface at separate locations on a substrate so that each separated species keeps its solution phase properties.

18. The method of claim 17 wherein the biochemical compound is a protein.

19. A method of separating species from a mixture of species of material and collecting individual species, the method comprising:

converting the mixture to gas phase ions for each species of the mixture, separating the species of the mixture based upon mass/charge ratio of the charged species, and collecting by soft-landing each separated species at different locations on a wet substrate surface so that each separated species keeps its solution phase properties.

20. A method of preparing a microarray of molecules on a substrate from a mixture of different molecules, the method comprising:

converting the molecules of the mixture of different molecules to gas phase molecular ions, separating the different molecular ions based upon mass/charge ratio of the ions, and depositing by soft landing the different molecular ions on a wet surface at different locations on the surface of the microarray substrate so that each separated different molecular ion keeps its solution phase properties.

21. A system for forming arrays of molecules from a mixture of molecules, the method comprising:

ionizing means for converting the mixture into gas phase ions of the different molecules in the mixture, separation means for separating the ions in accordance with their mass/charge ratio, a wet surface positioned in cooperative relationship with said separation means, and means for depositing by soft landing the separated molecules onto the wet surface at different locations so that each separated molecules keeps its solution phase properties.

22. A method of separating molecules of a biochemical compound, the method comprising:

converting the compound into ions of species of the compound, separating the species of the compound based upon mass/charge ratio of the charged ions, and collecting by soft landing the separated species on a wet surface at separate locations on a substrate so that each separated species keeps its solution phase properties.

* * * * *

UNITED STATES PATENT AND TRADEMARK OFFICE

CERTIFICATE OF CORRECTION

PATENT NO. : 7,361,311 B2
APPLICATION NO. : 10/335007
DATED : April 22, 2008
INVENTOR(S) : Cooks et al.

It is certified that error appears in the above-identified patent and that said Letters Patent is hereby corrected as shown below:

Column 3, line 37, delete "disorption" and insert --desorption--

Claim 11 column 12, line 55, delete "disorption" and insert --desorption--

Signed and Sealed this
Eighth Day of November, 2011

David J. Kappos
*Director of the United States Patent and Trademark Office*